United States Patent
Akolkar et al.

(10) Patent No.: US 11,250,332 B2
(45) Date of Patent: *Feb. 15, 2022

(54) AUTOMATED DISTRACTOR GENERATION BY PERFORMING DISAMBIGUATION OPERATIONS

(71) Applicant: International Business Machines Corporation, Armonk, NY (US)

(72) Inventors: Rahul P. Akolkar, Austin, TX (US); Kristi A. Farinelli, Philadelphia, PA (US); Srijith N. Prabhu, Austin, TX (US); Joseph L. Sharpe, III, Loveland, OH (US); Bruce R. Slawson, Palmdale, CA (US)

(73) Assignee: International Business Machines Corporation, Armonk, NY (US)

(*) Notice: Subject to any disclaimer, the term of this patent is extended or adjusted under 35 U.S.C. 154(b) by 1226 days.

This patent is subject to a terminal disclaimer.

(21) Appl. No.: 15/152,102

(22) Filed: May 11, 2016

(65) Prior Publication Data
US 2017/0330079 A1    Nov. 16, 2017

(51) Int. Cl.
*G06N 5/02* (2006.01)
*G06F 16/332* (2019.01)

(52) U.S. Cl.
CPC ......... *G06N 5/022* (2013.01); *G06F 16/3329* (2019.01)

(58) Field of Classification Search
CPC ........ H04N 5/23261; G06F 17/30; G09B 7/00
See application file for complete search history.

(56) References Cited

U.S. PATENT DOCUMENTS

| | | | |
|---|---|---|---|
| 6,292,792 B1* | 9/2001 | Baffes | G06N 5/022 706/45 |
| 6,493,663 B1* | 12/2002 | Ueda | G06F 40/35 704/9 |
| 8,555,407 B2 | 10/2013 | Villani et al. | |

(Continued)

OTHER PUBLICATIONS

'Automatic Generation of Challenging Distractors Using Context-Sensitive Inference Rules': Zesch, 2014, Proceedings of the Ninth Workshop on Innovative Use of NLP for Building Educational Applications.*

(Continued)

*Primary Examiner* — Li B. Zhen
*Assistant Examiner* — Peter D Coughlan
(74) *Attorney, Agent, or Firm* — Terrile, Cannatti & Chambers, LLP; Stephen A. Terrile

(57) ABSTRACT

A method, system and computer-usable medium are disclosed for automating the generation of an incorrect answer to a question suitable for a multiple choice exam. An input corpus of human-readable text associated with a subject domain is provided to a question generation system, where it is processed to generate a set of question-answer (QA) pairs. The set of QA pairs is then processed with the corpus of input text to extract a set of input keywords and concepts. A concept dependency graph is then used to perform disambiguation operations on the set of input keywords and concepts, and the reference keywords and concepts it contains, to generate a set of distractor words. The resulting set of distractor words is then processed with the set of QA pairs to generate a set of multiple choice question-answers that include various distractor answers.

20 Claims, 4 Drawing Sheets

(56) References Cited

U.S. PATENT DOCUMENTS

| | | | |
|---|---|---|---|
| 9,262,935 B2 | 2/2016 | Nielson et al. | |
| 2006/0235689 A1* | 10/2006 | Sugihara | G10L 15/1822 |
| | | | 704/257 |
| 2008/0033932 A1* | 2/2008 | DeLong | G06F 16/951 |
| 2014/0108006 A1* | 4/2014 | Vogel | G06F 17/28 |
| | | | 704/9 |
| 2014/0342323 A1* | 11/2014 | Nielson | G06F 17/274 |
| | | | 434/169 |
| 2014/0365502 A1 | 12/2014 | Haggar et al. | |
| 2015/0178623 A1* | 6/2015 | Balani | G06N 5/025 |
| | | | 706/48 |
| 2015/0179082 A1 | 6/2015 | Byron et al. | |
| 2016/0133148 A1 | 5/2016 | Hanks et al. | |

OTHER PUBLICATIONS

List of IBM Patents or Applications Treated as Related.

Zesch et al., Automatic Generation of Challenging Distractors using Context-Sensitive Inference Rules, Innovative use of NLP for Building Educational Applications, 2014, pp. 143-148.

Melamud et al., A Two Level for Context Sensitive Inference Rules, ACL, 2013, pp. 1331-1340.

High, Rob, "The Era of Cognitive Systems: An Inside Look at IBM Watson and How it Works," IBM Redbooks, 2012.

Yuan et al., "Watson and Healthcare," IBM developerWorks, 2011.

IBM, Journal of Research and Development, "This is Watson," Introduction and Table of Contents, vol. 56, No. 3/4, May/Jul. 2012, http://ieeexplore.ieee.org/xpl/tocresult.jsp?reload-true&isnumber=6177717.

Tseng, Ya-Min et al., "Generating Comprehension Questions Using Paraphrase," Technologies and Applications of Artificial Intelligence, Springer International Publishing, 2014, pp. 310-321.

Prepflash, "The Future of Studying," http://prod.prepflash.com/, printed Apr. 25, 2016.

Barzilay, Regina et al., "Learning to Paraphrase: An Unsupervised Approach Using Multiple-Sequence Alignment, "http://arxiv.org/pdf/cs/0304006.pdf.

Papasalouros, Andreas et al., "Automatic Generation of Multiple Choice Questions From Domain Ontologies," e-Learning, pp. 427-434, 2008, http://www.icsd.aegean.gr/kotis/publications/iadis2008.pdf.

Afzal, Naveed et al., "Automatic Generation of Multiple Choice Questions Using Dependency-Based Semantic Relations," Soft Computing 18, No. 7, 2014, pp. 1269-1281.

Vinu, E.V. et al, "A Novel Approach to Generate MCQs from Domain Ontology: Considering DL Semantics and Open-World Assumption," 2015, 21 pages.

Linnebank, Floris et al., "Question Generation and Answering," DynaLearn, EC FP7 STREP project 231526, 2010, 40 pages.

Allen et al., U.S. Appl. No. 14/967,492, filed Dec. 14, 2015, entitled Generating Multiple Choice Questions and Answer Based on Document Text.

* cited by examiner

AUTOMATED DISTRACTOR GENERATION BY PERFORMING DISAMBIGUATION OPERATIONS

BACKGROUND OF THE INVENTION

Field of the Invention

The present invention relates in general to the field of computers and similar technologies, and in particular to software utilized in this field. Still more particularly, it relates to a method, system and computer-usable medium for automating the generation of an incorrect answer to a question suitable for a multiple choice exam.

Description of the Related Art

A multiple choice question (MCQ) is a form of assessment in which respondents are presented a question and then asked to select the best possible answer(s) from a list. The MCQ format is commonly used in educational testing, market research, and elections. High quality MCQs used in educational testing, such as an exam, are typically composed of correct answers as well as plausible, yet misleading and incorrect, alternative answers that are designed to distract the person being tested. These distractive answers are, appropriately, referred to as distractors.

In general, manually generating a list of possible answers for MCQs used for testing can be tedious, time consuming, and error-prone. Generating high-quality distractor answers for an MCQ can often prove even more challenging. As an example of a low-quality distractor, a list of answers may contain the names of four cities located in Europe, and the name of one city located in the United States, as possible choices for a question asking, "What is the capitol of Belgium?" In this example, the low-quality distract or answer is the name of the city located in the United States. As another example, a list of answers may include the names of four cities located in the state of Washington as possible choices for a question asking, "What is the capitol of the state of Washington?" In this example, a high-quality distract or answer may be "Spokane," as opposed to "Olympia," which is the capitol.

Known approaches to the automated generation of MCQs include question generation systems. However, crafting high quality MCQs that accurately measure understanding with such systems can prove challenging. For example, certain of these systems generate MCQs, and associated distractors, by identifying keywords within a corpus of input text. This approach typically works well when the corpus contains keywords that are similar. Various systems are also known to use WordNet pairs to train a system to identify which words would make good distractors for a given word within a corpus of input text. However, this approach limits the distract or words that can be picked to those within a given location within the WordNet hierarchy. Various implementations of the web ontology language (OWL) may also be used by certain systems to generate MCQs and related distractors. However, the effectiveness of this approach is dependent upon the quality of the ontology used and how it is implemented.

SUMMARY OF THE INVENTION

A method, system and computer-usable medium are disclosed for automating the generation of an incorrect answer to a question suitable for a multiple choice exam. In various embodiments, an input corpus of human-readable text associated with a particular subject domain is provided to a question generation system, where it is processed to generate a set of question-answer (QA) pairs. The resulting set of QA pairs is then provided to a concept and keywords extraction system, where they are processed with the corpus of input text to extract a set of input keywords and concepts.

A reference corpus of relevant content is then used to generate a concept dependency graph that includes keywords and concepts associated with the subject domain of the input corpus, along with their respective interrelationships. In turn, the concept dependency graph is used to perform disambiguation operations on the set of input keywords and concepts, and the reference keywords and concepts, to generate a set of distract or words. The resulting set of distract or words is then processed with the set of QA pairs to generate a set of multiple choice question-answers that include various distract or answers, which are in turn provided as output.

In various embodiments, the distract or words are located in the concept dependency graph and not in the input corpus. In certain embodiments, individual multiple choice question-answers in the set of multiple choice question-answers are eliminated according to a question quality criteria based upon aspects including specificity, context, and ambiguity. In certain embodiments, the input corpus may one or more images, video content, audio content, or some combination thereof. In these embodiments, the multiple choice question-answers may respectively include distract or image, video or audio content associated with plausible, yet misleading and incorrect answers.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
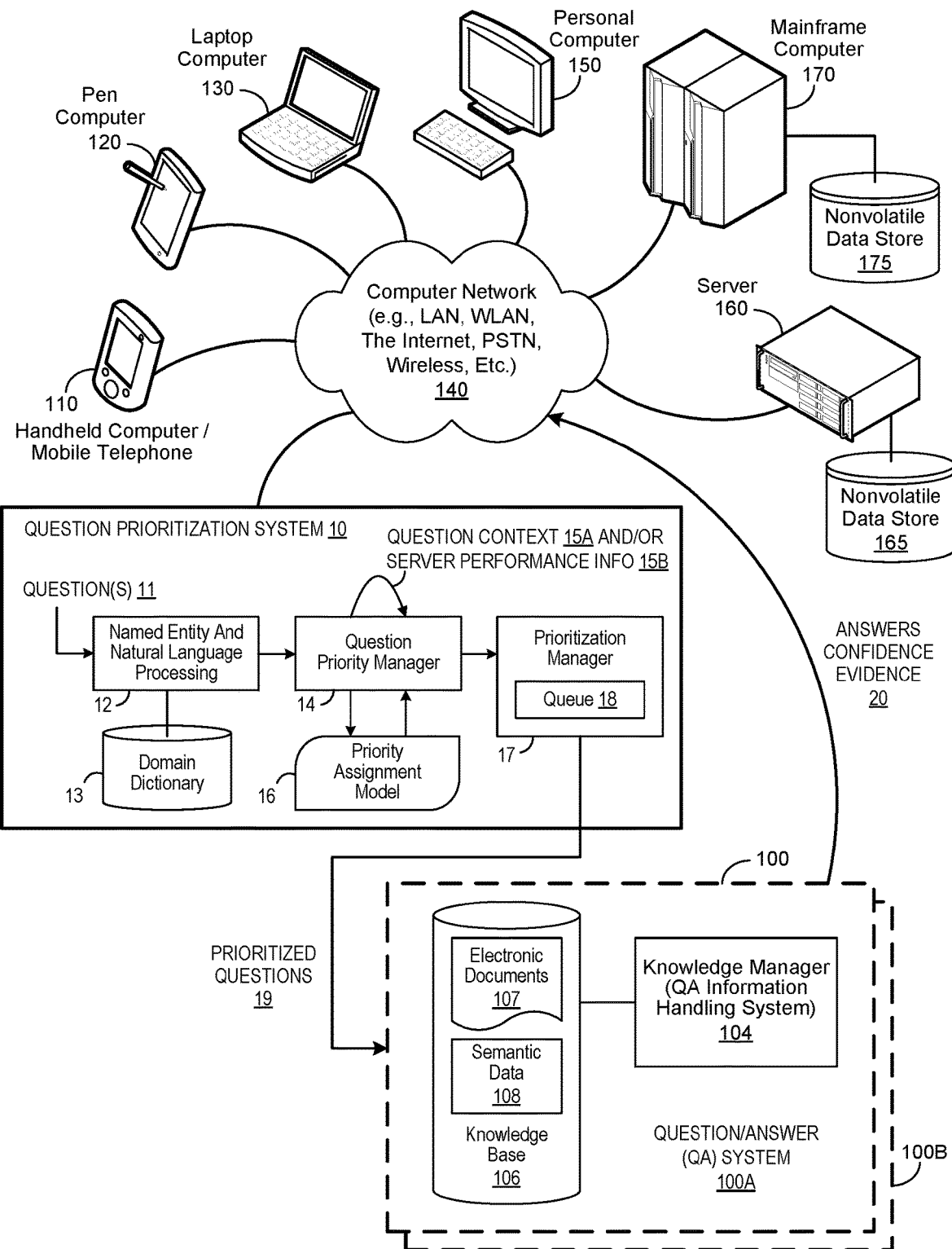
FIG. 1 depicts an exemplary client computer in which the present invention may be implemented.

A method, system and computer-usable medium are disclosed for automating the generation of an incorrect answer to a question suitable for a multiple choice exam. The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's Web Sphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are de-queued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores (e.g., server 160 utilizes nonvolatile data store 165, and mainframe computer 170 utilizes nonvolatile data store 175). The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
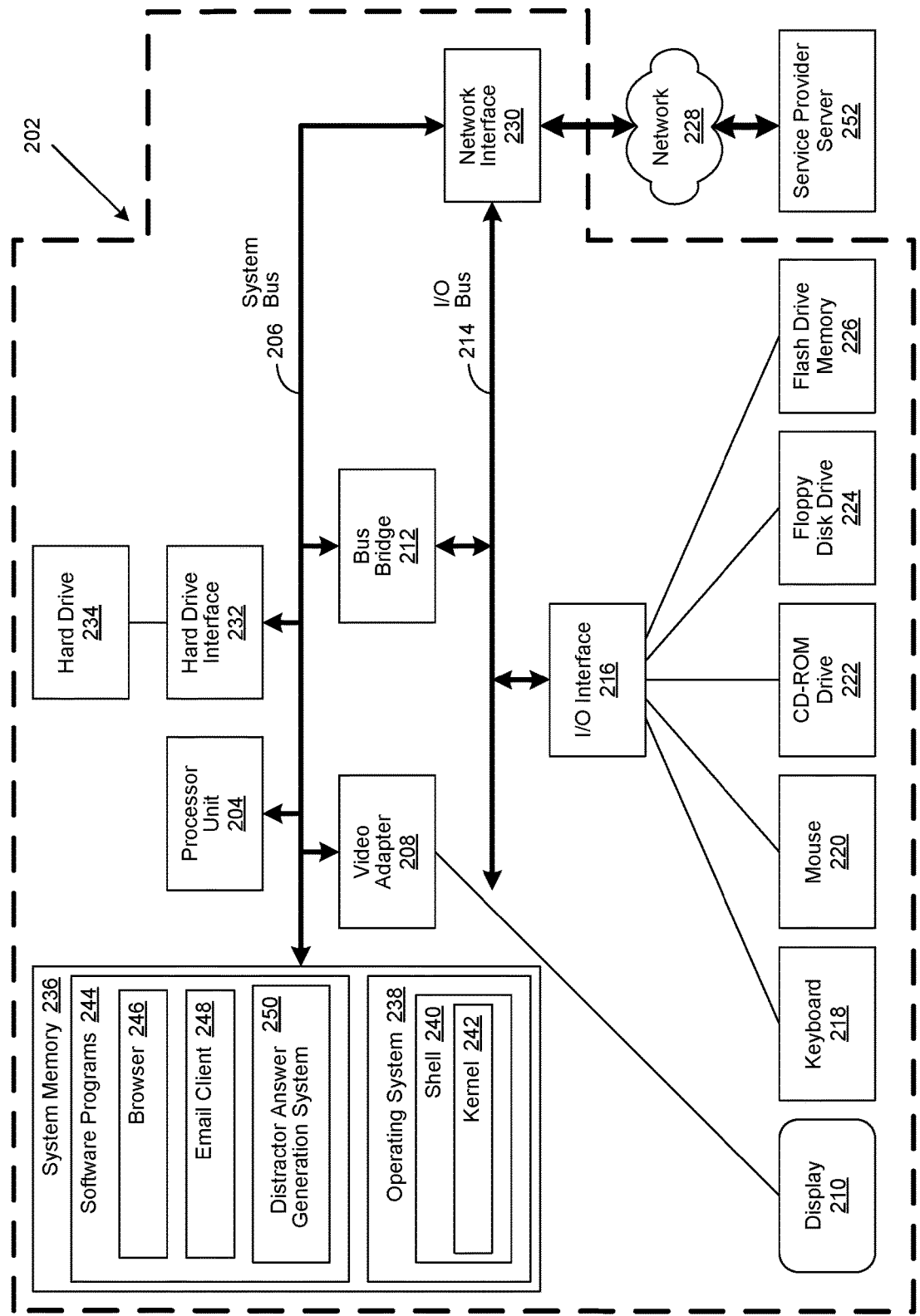
FIG. 2 is a simplified block diagram of an information handling system capable of performing computing operations.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a distract or answers generation system 250. In these and other embodiments, the distract or answers generation system 250 includes code for implementing the processes described hereinbelow. In one embodiment, information processing system 202 is able to download the distract or answers generation system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
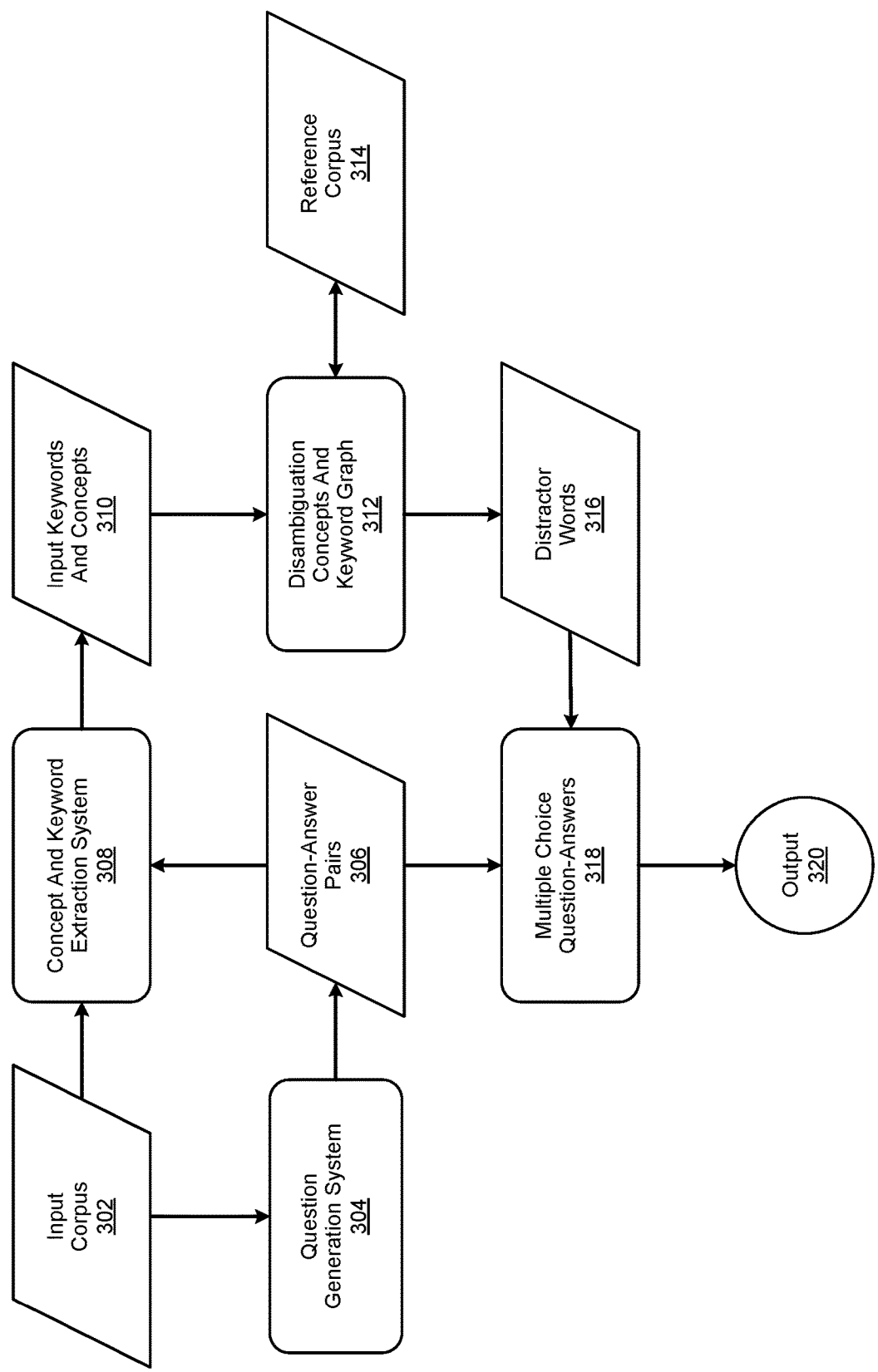
FIG. 3 is a simplified block diagram of a multiple choice question generation system.

FIG. 3 is a simplified block diagram of a multiple choice question-answer generation system implemented in accordance with an embodiment of the invention. Skilled practitioners of the art will be knowledgeable of various approaches for automating the generation of multiple choice questions (MCQs). Certain of these approaches generate MCQs, and associated distractors, by identifying keywords within an input corpus 302 of human-readable text. This approach typically works well when the input corpus 302 contains keywords that are similar.

Various approaches are also known to use WordNet pairs to train a system to identify which words would make good distractors for a given word within an input corpus 302. However, this approach limits the distract or words that can be chosen be proximate to a given location within the WordNet hierarchy. Those of skill in the art will be familiar with WordNet, which is a lexical database for the English language that groups English words into sets of synonyms known as synsets. WordNet also provides short definitions and usage examples, as well as defining various relationships between synsets or their members. As such, WordNet is a combination of a dictionary and a thesaurus that can often prove useful for automated text analysis and artificial intelligence (AI) applications.

Various implementations of the web ontology language (OWL), a family of knowledge representation languages for authoring ontologies, may also be used in certain approaches to generate MCQs and related distractors. As used herein, an ontology broadly refers to a structure used for knowledge representation that provides a formal naming and definition of concepts, types, instances, properties, roles, and interrelationships of entities associated with a particular domain. As such, ontologies provide a way to describe taxonomies and classification networks, essentially defining the structure of knowledge for various domains, where nouns represent classes of objects and verbs represent relationships between the objects.

While ontologies resemble class hierarchies in object-oriented programming, there are several differences. For example, class hierarchies are used to represent structures used in source code that evolve fairly slowly, whereas ontologies used to represent information may be evolving almost constantly. Likewise, ontologies are typically more flexible as they are meant to represent information that may be received from all manner of heterogeneous data sources. In contrast, class hierarchies are generally intended to be fairly static and rely on less diverse and more structured sources of data. Accordingly, the effectiveness of OWL-based approaches is contingent not only upon the quality of the ontology used, but also how it is implemented.

In this embodiment, automated multiple choice question-answer generation operations are begun by first receiving an input corpus 302 containing human-readable text associated with a particular subject domain. The input corpus 302 is then provided to a question generation system 304, where it is processed to generate a set of question-answer (QA) pairs 306. In various embodiments, the generation of the set of QA pairs 306 is provided as a service associated with the question generation system 304.

The resulting set of QA pairs 306 is then provided to a concept and keyword extraction system 308, where they are processed with the input corpus 302 to extract an associated set of input keywords and concepts 310. In various embodiments, the extraction of the set of input keywords and concepts 310 is provided as a service associated with the concept and keyword extraction system 308. A disambiguation concepts and keyword graph 312 is then used to perform disambiguation operations on the set of input keywords and concepts 310 to generate a set of distract or words 316 and decide which to use. For example, the word "May" could be the name of a person, a month of the year, or a verb. In this example, the word "May" would be disambiguated to mean a month of the year as a distract or answer for a MCQ that asks, "In which month does Flag Day occur?"

In various embodiments, the disambiguation concepts and keyword graph 312 is implemented as a concept dependency graph. As used herein, a concept dependency graph broadly refers to an ontology of concepts and keywords associated with a particular subject domain. In these embodiments, the concept dependency graph signifies which concepts are sub-concepts of one another, associates keywords for each concept and maintains each concept's respective prerequisites. In certain embodiments, the concept dependency graph is implemented to curate an input corpus 302. The resulting curated corpus of input text is then used to generate MCQs and associated distract or words 316 based upon a given concept and its respective prerequisites.

In various embodiments, a reference corpus 314 of relevant content is used to generate a concept dependency graph that includes keywords and concepts associated with the subject domain of the input corpus 302, along with their respective interrelationships. In certain of these embodiments, these reference keywords and concepts are processed with the previously-generated input keywords and concepts 310 to generate disambiguated distract or words 316 that are not present in the input corpus 302. Accordingly, the resulting distract or words 316 may be located in various locations within the WordNet hierarchy that are not proximate to the WordNet location of words within the input corpus 302.

In various embodiments, a machine learning model and a natural language processing (NLP) library, both of which will be familiar to skilled practitioners of the art, are used to train a question-answer (QA) system to discard questions and answers that do not meet predetermined quality standards. For example, the question "Where does this happen?" may be considered to be of low quality due to the object of the question being a pronoun. As a result, the question would be eliminated, or alternatively, previous sentences would be included in the question to provide context. As another example, the system may be trained to discard a question if the correct answer is a pronoun. In various embodiments, a question may be eliminated if it is determined that it does not meet quality criteria associated with specificity, context, ambiguity, or any combination thereof. In certain embodiments, an NLP library is implemented to determine which keywords can be used for detractors as they will likely share the same part of speech.

The resulting set of distract or words 316 is then processed with the set of QA pairs 306 to generate a set of multiple choice question-answers 318 that include various distract or answers. In turn, the multiple choice question-answers 318 are then provided as output 320. Following is an example of an implementation of this embodiment:

---

1) Input Text: The dog went over the moon. He was happy.
2) Question Generation output:
   a. "What went over the moon?" The dog.
   b. "Who was happy?" He.
3) Concepts and Keyword Extraction output:
   Concepts: nursery rhyme
   Keywords: dog, moon, happy
4) Disambiguation output:
   Dog => cat, bird, cow
   Moon => sun, earth, planet
   Happy => sad, well, fearful
5) Output MCQ:
   a. "What went over the moon?" dog, cat, bird, cow
   b. "Who was happy?" is removed because the answer is a pronoun.

---

In one embodiment, the input corpus 302 includes one or more images. In this embodiment, the multiple choice question-answers 318 include distract or images associated with plausible, yet misleading and incorrect answers. In another embodiment, the input corpus 302 includes video content. In this embodiment, the multiple choice question-answers 318 include distract or video content associated with plausible, yet misleading and incorrect answers. In yet another embodiment, the input corpus 302 includes audio content. In this embodiment, the multiple choice question-answers 318 include distract or audio content associated with plausible, yet misleading and incorrect answers.

In certain of these embodiments, the input corpus 302 may include text or keywords associated with the images, video content, and audio content. In these embodiments, the text or keywords are processed, as described in greater detail herein, to generate plausible, yet misleading and incorrect, answers. Those of skill in the art will recognize that many such embodiments are possible and the foregoing is not intended to limit the spirit, scope or intent of the invention.

Figure 4:
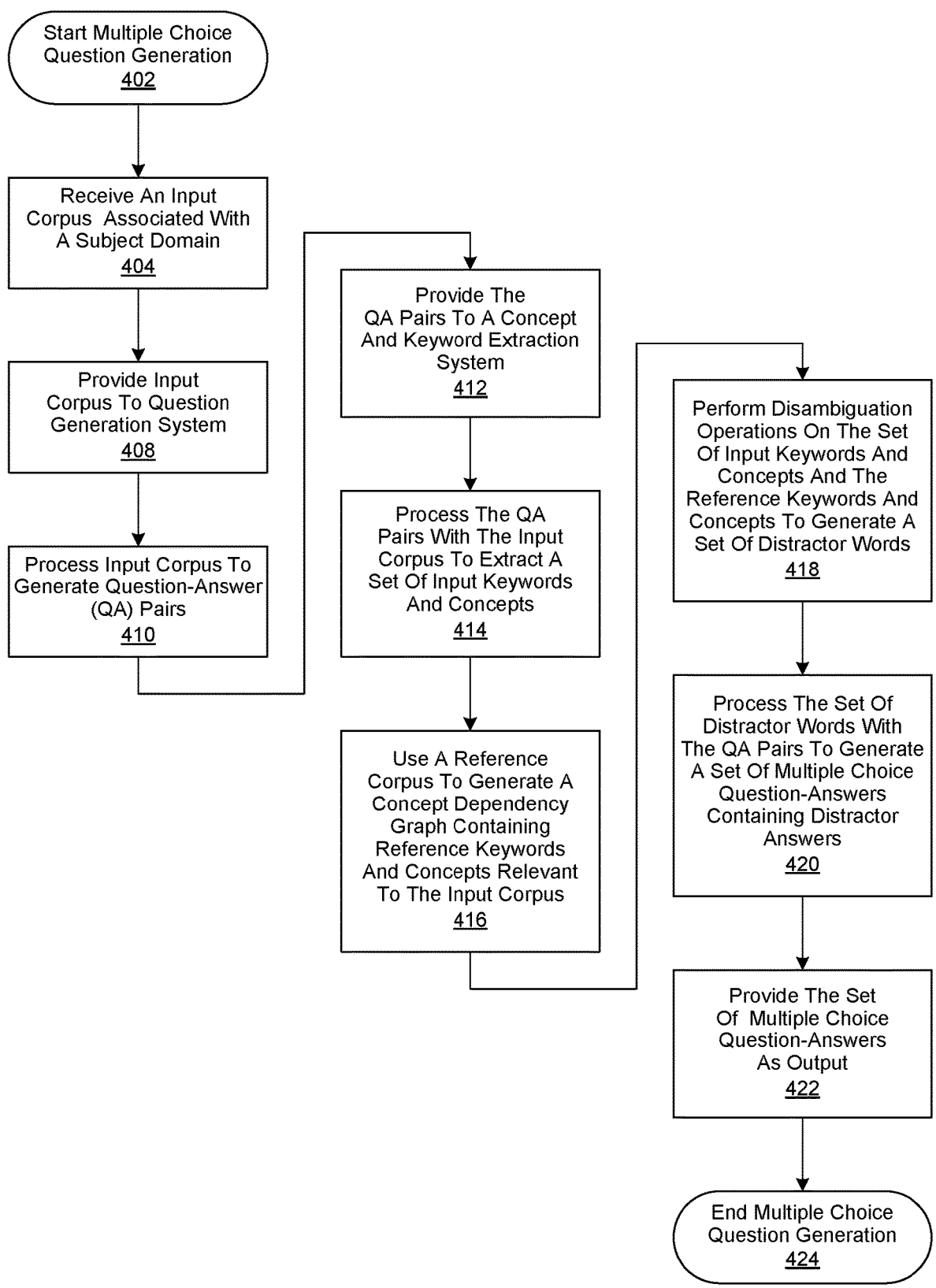
FIG. 4 is a generalized flowchart of the performance of multiple choice question generation operations.

FIG. 4 is a generalized flowchart of the performance of automated multiple choice question generation operations implemented in accordance with an embodiment of the invention. In this embodiment, automated multiple choice question generation operations are begun in step 402, followed by the receipt in step 404 of an input corpus of human-readable text associated with a particular subject domain. The input corpus is then provided in step 408 to a question generation system where it is processed in step 410 to generate a set of question-answer (QA) pairs. In various embodiments, the generation of the set of QA pairs is provided as a service associated with the question generation system.

The resulting set of QA pairs is then provided to a concept and keywords extraction system in step 412, where they are processed with the corpus of input text in step 414 to extract a set of input keywords and concepts. In various embodiments, the extraction of the set of input keywords and concepts is provided as a service associated with the concept and keyword extraction system. A reference corpus of relevant content is then used in step 416 to generate a concept dependency graph that includes keywords and concepts associated with the subject domain of the input corpus, along with their respective interrelationships.

In turn, the concept dependency graph is used in step 418 to perform disambiguation operations, as described in greater detail herein, on the set of input keywords and concepts, and the reference keywords and concepts, to generate a set of distract or words. The resulting set of distract or words is then processed in step 420 with the set of QA pairs generated in step 410 to generate a set of multiple choice question-answers that include various distract or answers, which are in turn provided as output in step 422. Automated multiple choice question generation operations are then ended in step 424.

Although the present invention has been described in detail, it should be understood that various changes, substitutions and alterations can be made hereto without departing from the spirit and scope of the invention as defined by the appended claims.

What is claimed is:

1. A computer-implemented method for automating the generation of an incorrect answer to a question suitable for a multiple choice exam, comprising:
   receiving an input corpus associated with a subject domain;
   using a reference corpus to generate a concept dependency graph contains content associated with the subject domain of the input corpus, the content associated with the subject domain providing an ontology of concepts associated with a particular subject domain, the concept dependency graph signifying certain concepts as sub-concepts of other concepts, associating keywords for each concept and maintaining respective prerequisites for each concept;
   identifying relationships between reference keywords and concepts within the concept dependency graph;
   processing the input corpus to generate question-answer (QA) pairs, the processing using identified relationships between the reference keyword sand concepts within the concept dependency graph;
   processing the input corpus and the QA pairs to extract a set of input keywords and concepts;
   performing disambiguation operations on the set of input keywords and concepts, and reference keywords and concepts, to generate a set of distractor words, disambiguation concepts being represented within a disambiguation concepts and keyword graph of the concept dependency graph, the disambiguation concepts and keyword graph being used to perform the disambiguation operation, the disambiguation operation identifying words that are related to a particular subject domain of an input keyword, the set of distractor words not being present in the input corpus;
   processing the set of distractor words with the QA pairs to generate a set of multiple choice question-answers containing a set of distractor answers, the set of distractor answers being based upon the set of distractor words; and,
   training a question-answer (QA) system to discard questions and answers that do not meet predetermined quality standards, the predetermined quality standards comprising determining at least one of whether an object of the question is a pronoun, a correct answer is a pronoun and the question does not meet quality criteria associated with at least one of specificity, content and ambiguity.

2. The method of claim 1, wherein:
   the concept dependency graph is implemented to curate the input corpus.

3. The method of claim 2, wherein:
   the reference corpus content contains reference keywords and concepts associated with the subject domain; and,
   the reference keywords and concepts are used to generate the concept dependency graph.

4. The method of claim 2, wherein:
   the distractor words are located in the concept dependency graph and not in the input corpus; and,
   the set of distractor answers are based upon the set of distractor words.

5. The method of claim 1, further comprising:
   eliminating individual multiple choice question-answers in the set of multiple choice question-answers according to a question quality criteria based upon aspects selected from a group consisting of specificity, context, and ambiguity.

6. The method of claim 1, wherein the input corpus includes at least one of the set of a text, an image, video content, and audio content.

7. A system comprising:
   a processor;
   a data bus coupled to the processor; and
   a computer-usable medium embodying computer program code, the computer-usable medium being coupled to the data bus, the computer program code used for automating the generation of an incorrect answer to a question suitable for a multiple choice exam and comprising instructions executable by the processor and configured for:
   receiving an input corpus associated with a subject domain;
   using a reference corpus to generate a concept dependency graph contains content associated with the subject domain of the input corpus, the content associated with the subject domain providing an ontology of concepts associated with a particular subject domain, the concept dependency graph signifying certain concepts as sub-concepts of other concepts, associating keywords for each concept and maintaining respective prerequisites for each concept;
   identifying relationships between reference keywords and concepts within the concept dependency graph;
   processing the input corpus to generate question-answer (QA) pairs, the processing using identified relationships between the reference keyword sand concepts within the concept dependency graph;
   processing the input corpus and the QA pairs to extract a set of input keywords and concepts;
   performing disambiguation operations on the set of input keywords and concepts, and reference keywords and concepts, to generate a set of distractor words, disambiguation concepts being represented within a disambiguation concepts and keyword graph of the concept dependency graph, the disambiguation concepts and keyword graph being used to perform the disambiguation operation, the disambiguation operation identifying words that are related to a particular subject domain of an input keyword, the set of distractor words not being present in the input corpus;

processing the set of distractor words with the QA pairs to generate a set of multiple choice question-answers containing a set of distractor answers, the set of distractor answers being based upon the set of distractor words, and, training a question-answer (QA) system to discard questions and answers that do not meet predetermined quality standards, the predetermined quality standards comprising determining at least one of whether an object of the question is a pronoun, a correct answer is a pronoun and the question does not meet quality criteria associated with at least one of specificity, content and ambiguity.

8. The system of claim 7, wherein:
the concept dependency graph is implemented to curate the input corpus.

9. The system of claim 8, wherein:
the reference corpus content contains reference keywords and concepts associated with the subject domain; and,
the reference keywords and concepts are used to generate the concept dependency graph.

10. The system of claim 8, wherein:
the distractor words are located in the concept dependency graph and not in the input corpus; and,
the set of distractor answers are based upon the set of distractor words.

11. The system of claim 7, further comprising:
eliminating individual multiple choice question-answers in the set of multiple choice question-answers according to a question quality criteria based upon aspects selected from a group consisting of specificity, context, and ambiguity.

12. The system of claim 7, wherein the input corpus includes at least one of the set of a text, an image, video content, and audio content.

13. A non-transitory, computer-readable storage medium embodying computer program code, the computer program code comprising computer executable instructions configured for:

receiving an input corpus associated with a subject domain;

using a reference corpus to generate a concept dependency graph contains content associated with the subject domain of the input corpus, the content associated with the subject domain providing an ontology of concepts associated with a particular subject domain, the concept dependency graph signifying certain concepts as sub-concepts of other concepts, associating keywords for each concept and maintaining respective prerequisites for each concept;

identifying relationships between reference keywords and concepts within the concept dependency graph;

processing the input corpus to generate question-answer (QA) pairs, the processing using identified relationships between the reference keyword sand concepts within the concept dependency graph;

processing the input corpus and the QA pairs to extract a set of input keywords and concepts;

performing disambiguation operations on the set of input keywords and concepts, and reference keywords and concepts, to generate a set of distractor words, disambiguation concepts being represented within a disambiguation concepts and keyword graph of the concept dependency graph, the disambiguation concepts and keyword graph being used to perform the disambiguation operation, the disambiguation operation identifying words that are related to a particular subject domain of an input keyword, the set of distractor words not being present in the input corpus; and processing the set of distractor words with the QA pairs to generate a set of multiple choice question-answers containing a set of distractor answers, the set of distractor answers being based upon the set of distractor words; and, training a question-answer (QA) system to discard questions and answers that do not meet predetermined quality standards, the predetermined quality standards comprising determining at least one of whether an object of the question is a pronoun, a correct answer is a pronoun and the question does not meet quality criteria associated with at least one of specificity, content and ambiguity.

14. The non-transitory, computer-readable storage medium of claim 13, wherein:
the concept dependency graph is implemented to curate the input corpus.

15. The non-transitory, computer-readable storage medium of claim 14, wherein:
the reference corpus content contains reference keywords and concepts associated with the subject domain; and,
the reference keywords and concepts are used to generate the concept dependency graph.

16. The non-transitory, computer-readable storage medium of claim 14, wherein:
the distractor words are located in the concept dependency graph and not in the input corpus; and,
the set of distractor answers are based upon the set of distractor words.

17. The non-transitory, computer-readable storage medium of claim 13, further comprising:
eliminating individual multiple choice question-answers in the set of multiple choice question-answers according to a question quality criteria based upon aspects selected from a group consisting of specificity, context, and ambiguity.

18. The non-transitory, computer-readable storage medium of claim 13, wherein the input corpus includes at least one of the set of a text, an image, video content, and audio content.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *